US011054553B2

(12) United States Patent
Liu et al.

(10) Patent No.: US 11,054,553 B2
(45) Date of Patent: Jul. 6, 2021

(54) DISPLAY APPARATUS WITH MULTI SCREENS

(71) Applicant: CHAMP VISION DISPLAY INC., Miao-Li County (TW)

(72) Inventors: Chin-Ku Liu, Miao-Li County (TW); Chung-Hao Wu, Miao-Li County (TW)

(73) Assignee: CHAMP VISION DISPLAY INC., Miao-Li County (TW)

( * ) Notice: Subject to any disclaimer, the term of this patent is extended or adjusted under 35 U.S.C. 154(b) by 16 days.

(21) Appl. No.: 16/790,748

(22) Filed: Feb. 14, 2020

(65) Prior Publication Data

US 2020/0264347 A1 Aug. 20, 2020

(30) Foreign Application Priority Data

Feb. 18, 2019 (CN) .......................... 201910119291.9

(51) Int. Cl.
*G02B 5/04* (2006.01)
(52) U.S. Cl.
CPC .................................... *G02B 5/045* (2013.01)
(58) Field of Classification Search
CPC ..................................................... G02B 5/045
USPC ......................................................... 359/834
See application file for complete search history.

(56) References Cited

U.S. PATENT DOCUMENTS

| 9,851,480 B2* | 12/2017 | Liu | G02F 1/1335 |
| 10,012,857 B2* | 7/2018 | Liu | G02B 5/045 |
| 10,504,451 B2* | 12/2019 | Liu | G06F 3/1446 |
| 10,809,959 B2* | 10/2020 | Liu | G09G 3/3406 |
| 10,929,086 B2* | 2/2021 | Liu | G09G 5/373 |
| 10,955,874 B2* | 3/2021 | Liu | G02B 5/3066 |
| 2003/0231144 A1* | 12/2003 | Cho | G02F 1/13336 345/1.3 |
| 2010/0277665 A1* | 11/2010 | Kuo | G09F 9/301 349/58 |
| 2011/0164200 A1* | 7/2011 | Watanabe | G02F 1/13336 349/58 |
| 2015/0116852 A1* | 4/2015 | Kim | G02B 17/002 359/834 |

(Continued)

FOREIGN PATENT DOCUMENTS

| CN | 105448196 A | 3/2016 |
| CN | 109036152 A | 12/2018 |

(Continued)

*Primary Examiner* — Ricky D Shafer

(57) ABSTRACT

A display apparatus with multi screens includes a plurality of display screens and a prism structure optical element disposed between two adjacent display screens. The prism structure optical element includes a base and a plurality of prism pillars arranged on the base in a predetermined direction and facing two adjacent display screens. The base includes adjacent a first region and a second region. Lengths of the first region and the second region along the predetermined direction are La and Lb, respectively, wherein La≥Lb. The prism pillars include a plurality of first prism pillars arranged in the first region and a plurality of second prism pillars arranged in the second region. Each of the first prism pillars and the second prism pillars respectively has a total reflecting surface and a refracting surface. The total reflecting surface is located between the refracting surface and an adjacent area.

8 Claims, 9 Drawing Sheets

(56) References Cited

U.S. PATENT DOCUMENTS

2017/0131583 A1* 5/2017 Liu .................. G02B 30/27
2018/0040281 A1* 2/2018 Liu .................. G06F 3/1446
2019/0380213 A1* 12/2019 Liu .................... G02B 7/00

FOREIGN PATENT DOCUMENTS

| CN | 110189630 A | 8/2019 |
| TW | I411848 B | 10/2013 |
| TW | 201728963 A | 8/2017 |
| TW | I642050 B | 11/2018 |
| WO | 2013012360 A1 | 1/2013 |

* cited by examiner

DISPLAY APPARATUS WITH MULTI SCREENS

CROSS-REFERENCE TO RELATED APPLICATION

This application claims the priority benefit of China application 201910119291.9, filed on Feb. 18, 2019. The entirety of the above-mentioned patent application is hereby incorporated by reference herein and made a part of this specification.

FIELD OF THE INVENTION

The invention relates to a display apparatus, and more particularly to a display apparatus with multi screens.

BACKGROUND OF THE INVENTION

People who have used a display apparatus with multi screens know the convenience of the display apparatus with multi screens. Because using multi screens can receive more information from the screens at the same time, and achieve rapid analysis and integration of multiplex effects, the display apparatus with multi screens has been widely used in specific industries, such as the stock securities industry. In general, using multi screens can also help increase work efficiency. In addition, the multi screens simultaneous output allows a user to adjust the size of a desired viewing screen and enjoy different visual perceptions. Moreover, current high level graphics cards almost all support multi screens output. After the user buys multiple screens, they can splice the desired display configuration manner and enjoy better viewing quality. In addition, in the market of audio-visual entertainment, display with multi screens is also one of the focuses that players expect to enjoy.

On the other hand, in the display industry, a curved screen is considered as one of the key development projects. The curved screen has a visual experience that is immersive. A design of a curved surface makes a viewer feel like being surrounded by a no dead angle, and the visual effect is more vivid when a depth of field becomes deeper or a viewing distance becomes closer.

However, whether it is a flat screen or a curved screen, it includes a frame around a display area. When using a plurality of screens to splice, the frame at the splicing place will affect the viewing quality.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a display apparatus with multi screens, which reduces the problem that the frames of the screens affect the display quality.

Other advantages and objects of the invention may be further illustrated by the technical features broadly embodied and described as follows.

In order to achieve one or a portion of or all of the objects or other objects, a display apparatus with multi screens provided in an embodiment of the invention includes a plurality of display screens and at least one prism structure optical element. The display screens are arranged adjacent to each other, and at least one of the two adjacent display screens of the display screens have an included angle greater than 90 degrees and less than 180 degrees. Each of the display screens has a display area and a frame surrounding the display area. Each of the prism structure optical elements is disposed between two adjacent display screens having an included angle, and covers two side edges adjacent to each other in the frames and portions of the display areas of the two adjacent display screens. Each of the prism structure optical elements includes a base and a plurality of prism pillars. The prism pillars are arranged on the base in a predetermined direction and face the two adjacent display screens, and each of the prism pillars extend in a direction substantially parallel to the two side edges adjacent to each other. The base includes a first region and a second region adjacent to the first region, respectively corresponding to portions of the two adjacent display screens. The first region has a length La in the predetermined direction, the second region has a length Lb in the predetermined direction, and La≥Lb. The prism pillars include a plurality of first prism pillars arranged in the first region and a plurality of second prism pillars arranged in the second region. Each of the first prism pillars has a first total reflecting surface and a first refracting surface, and the first total reflecting surface is located between the first refracting surface and the second region. Each of the second prism pillars has a second total reflecting surface and a second refracting surface, and the second total reflecting surface is located between the second refracting surface and the first region.

The display apparatus with multi screens of the embodiment of the invention has a prism structure optical element covering two side edges adjacent to each other in the frames of the two adjacent display screens and portions of the display areas of the two adjacent display screens. The prism structure optical element can direct a light emitted from a portion of the display area that is covered by the prism structure optical element to a viewer's eye, so that when the viewer views an image composed of multi display screens, it is not easy to perceive the frame and the prism structure optical element between the two adjacent display screens, thereby improving the display quality. In addition, the prism pillars of the prism structure optical element are disposed on a side facing the two adjacent display screens, which can prevent the prism pillars from being damaged or scratched by touching the prism pillars when the viewer adjusts or disposes the prism structure optical element, thereby affecting the display quality.

Other objectives, features and advantages of The invention will be further understood from the further technological features disclosed by the embodiments of The invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
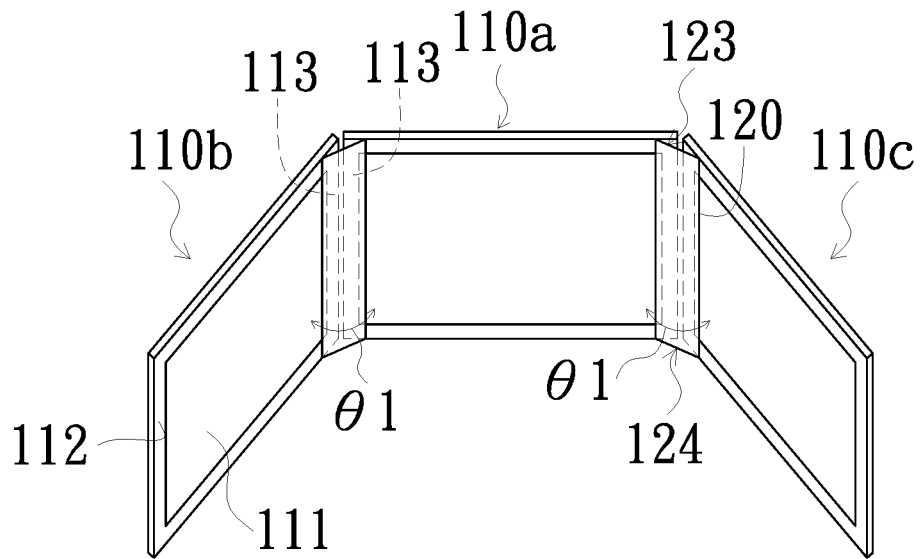
FIG. 1 is a schematic diagram of a display apparatus with multi screens of one embodiment of the invention.

FIG. 1 is a schematic diagram of a display apparatus with multi screens of one embodiment of the invention. Referring to FIG. 1, a display apparatus with multi screens 100 of the embodiment includes a prism structure optical element 120 and a plurality of display screens, and FIG. 1 is exemplified by three display screens 110a, 110b, and 110c. The display screens 110a, 110b, and 110c are arranged adjacent to each other, and at least one of the two adjacent display screens of the display screens 110a, 110b, and 110c have an included angle θ1 greater than 90 degrees and less than 180 degrees. In the embodiment, the two adjacent display screens 110a, 110b have the included angle θ1, and the two adjacent display screens 110a, 110c also have the included angle θ1. The angle of the included angle θ1 can be determined by different design requirements. In addition, each of the display screens 110a, 110b, 110c has a display area 111 and a frame 112 surrounding the display area 111. The display screens 110a, 110b, and 110c of the embodiment may be various types of display screens, such as a liquid crystal display screen, an organic light-emitting diode display screen, etc., but are not limited thereto. The display screens 110a, 110b, 110c may be flat display screens or curved display screens.

The prism structure optical element 120 is disposed between two adjacent display screens having an included angle θ1, for example, disposed between the display screens 110a and 110b and disposed between the display screens 110a and 110c. That is, the quantity of the prism structure optical element 120 may be one or more, and a prism structure optical element 120 is disposed between any two adjacent display screens having an included angle θ1. In other embodiments, it is also determined by design requirements whether a prism structure optical element 120 is disposed between the two adjacent display screens having an included angle θ1 of all the display screens, for example, the prism structure optical element 120 is disposed between the display screens 110a and 110b, but not disposed between the display screens 110b and 110c. In addition, each of the prism structure optical elements 120 cover two side edges 113 adjacent to each other in the frames 112 of the corresponding two adjacent display screens and portions of the two display areas 111. For example, the prism structure optical element 120 corresponding to the display screens 110a, 110b is disposed to be respectively and relatively inclined to the two side edges 113 adjacent to each other of the display screens 110a, 110b and portions of the two display areas 111 of the display screens 110a, 110b, so as to cover the two side edges 113 adjacent to each other in the frames 112 of the display screens 110a, 110b and portions of the two display areas 111 of the display screens 110a, 110b; the prism structure optical element 120 corresponding to the display screens 110a, 110c is disposed to be respectively and relatively inclined to the two side edges 113 adjacent to each other of the display screens 110a, 110c and portions of the two display areas 111 of the display screens 110a, 110c, so as to cover the two side edges 113 adjacent to each other in the frames 112 of the display screens 110a, 110c and portions of the two display areas 111 of the display screens 110a, 110c. In other words, the prism structure optical element 120 corresponding to the display screens 110a, 110b is not parallel or perpendicular to the display screens 110a, 110b, and the prism structure optical element 120 corresponding to the display screens 110*a*, 110*c* is not parallel or perpendicular to the display screens 110*a*, 110*c*.

Figure 2:
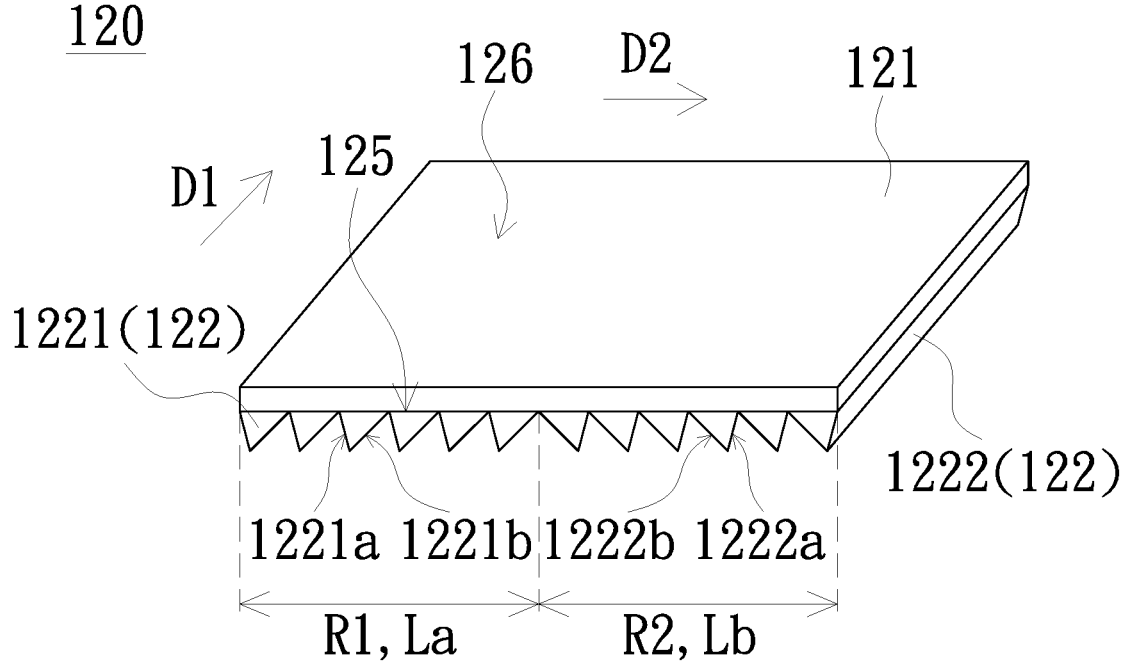
FIG. 2 is a schematic diagram of a prism structure optical element of FIG. 1.

FIG. 2 is a schematic diagram of a prism structure optical element of FIG. 1. Referring to FIG. 1 and FIG. 2, the prism structure optical element 120 includes a base 121 and a plurality of prism pillars 122 disposed adjacent to each other on the base 121. The prism pillars 122 are arranged on the base 121 in a predetermined direction D2 and face the two display screens 110*a*, 110*b* or 110*a*, 110*c*, and an extension direction D1 of each of the prism pillars 122 is substantially parallel to the two side edges 113 adjacent to each other of the two frames 112 covered by the prism structure optical element 120 of FIG. 1. That is, each of the prism pillars 122 extends from an upper end 123 to a lower end 124 of the prism structure optical element 120 of FIG. 1. The extension direction D1 of each of the prism pillars 122 is parallel to the longitudinal sides of the display area 111. The base 121 includes a first region R1 and a second region R2 adjacent to the first region R1, respectively corresponding to portions of the two display screens 110*a*-110*b* or 110*a*, 110*c* of FIG. 1. The first region R1 has a length La in the predetermined direction D2, the second region R2 has a length Lb in the predetermined direction D2, and La≥Lb, and FIG. 2 is exemplified by La=Lb. In addition, the base 121 has, for example, a bearing surface 125 facing the two adjacent display screens (e.g., facing the display screens 110*a*, 110*b* or facing the display screens 110*a*, 110*c*), that is, the bearing surface 125 is farther from a viewer. The prism pillars 122 are disposed on the bearing surface 125 and includes a plurality of first prism pillars 1221 arranged in the first region R1 and a plurality of second prism pillars 1222 arranged in the second region R2. Each of the first prism pillars 1221 has a first refracting surface 1221*a* and a first total reflecting surface 1221*b*, and the first total reflecting surface 1221*b* is located between the first refracting surface 1221*a* and the second region R2. Each of the second prism pillars 1222 has a second refracting surface 1222*a* and the second total reflecting surface 1222*b*, and the second total reflecting surface 1222*b* is located between the second refracting surface 1222*a* and the first region R1. The base 121 of the embodiment is, for example, a film, but the invention does not limit the specific shape of the base 121. In addition, each of the prism pillars 122 in the embodiment is, for example, a triangular prism pillar, but is not limited thereto.

Since the prism pillars 122 of the prism structure optical element 120 are disposed on a side facing the two adjacent display screens, which can prevent the prism pillars 122 from being damaged or scratched by touching the prism pillars 122 when the viewer adjusts or disposes the prism structure optical element 120, as compared to be disposed on a side away from the two adjacent display screens, thereby affecting the display quality.

Figure 3:
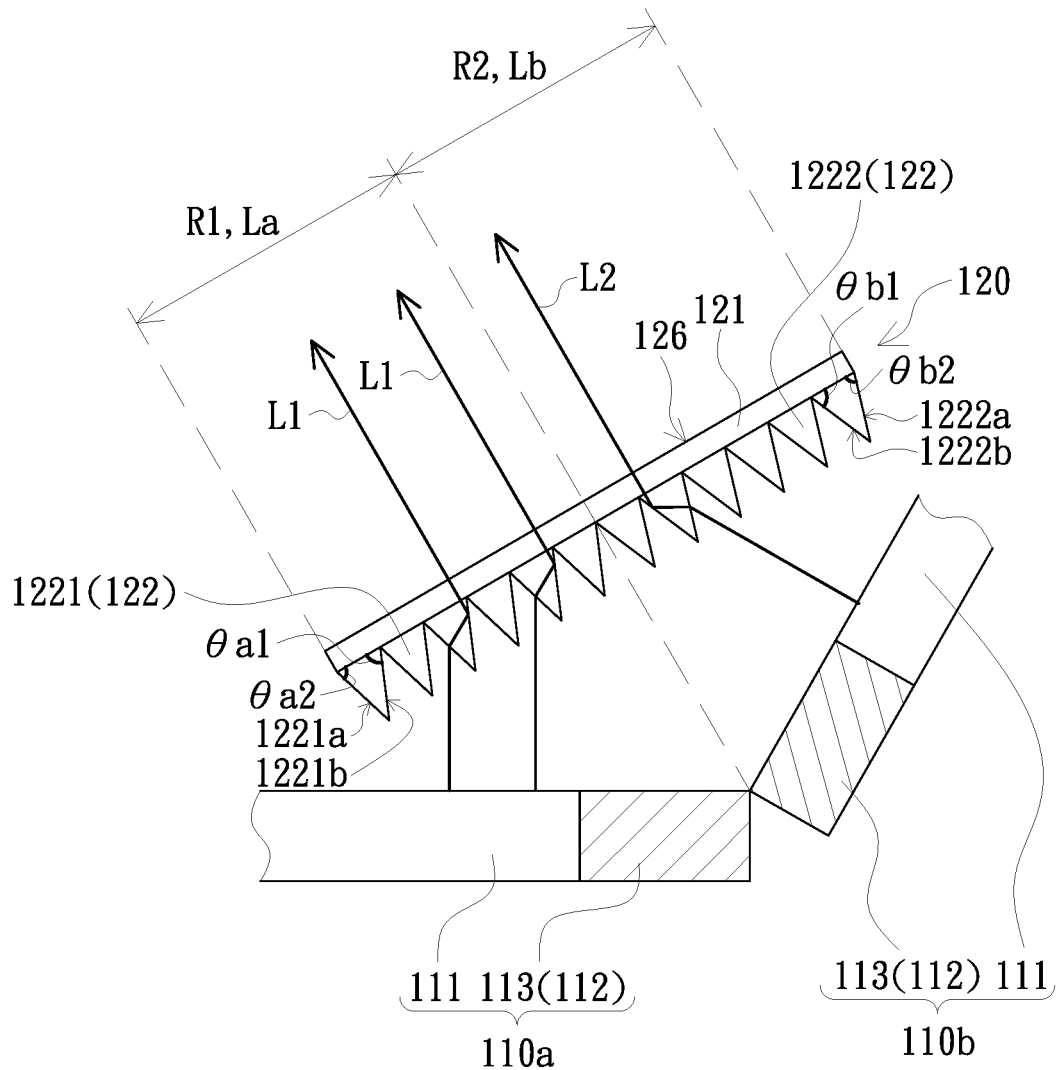
FIG. 3 is a schematic diagram of a prism structure optical element of a display apparatus with multi screens refracting light of one embodiment of the invention.

FIG. 3 is a schematic diagram of a prism structure optical element of a display apparatus with multi screens refracting light of one embodiment of the invention. Referring to FIG. 2 and FIG. 3, the first region R1 of the prism structure optical element 120 of the embodiment corresponds to, for example, the display screen 110*a* located in the middle of the display screens 110*a*, 110*b*, 110*c* of FIG. 1. When a light beam L1 emitted forward from the display area 111 of the display screen 110*a* is incident on the first prism pillar 1221 via the first refracting surface 1221*a*, it is refracted to the first total reflecting surface 1221*b*. Since an incident angle of the light beam L1 is greater than a critical angle, total reflection is generated at the first total reflecting surface 1221*b* and substantially emitted forward from the surface 126 of the base 121 away from the prism pillar 122 (The light beam is substantially perpendicular to the surface 126 when it exits). Similarly, when a light beam L2 emitted forward from the display area 111 of the display screen 110*b* is incident on the second prism pillar 1222 via the second refracting surface 1222*a*, it is refracted to the second total reflecting surface 1222*b*. Since an incident angle of the light beam L2 is greater than a critical angle, total reflection is generated at the second total reflecting surface 1222*b* and substantially emitted forward from the surface 126. In one embodiment, two ends of the prism structure optical element 120 respectively covering portions of the display areas 111 of the two adjacent display screens 110*a*, 110*b* respectively abut against the display areas 111 of the two adjacent display screens 110*a*, 110*b* to be stably fixed on the two adjacent display screens 110*a*, 110*b*. In another embodiment, the prism structure optical element 120 may also be fixed by other mechanisms, so that two ends of the prism structure optical element 120 respectively covering portions of the display areas 111 of the two adjacent display screens 110*a*, 110*b* do not abut against the display areas 111 of the two adjacent display screens 110*a*, 110*b* (as shown in FIG. 3), but the invention is not limited thereto. The similar descriptions of figures are not repeated hereinafter.

Depending on the design requirements, the relative tilt between the prism structure optical element 120 and its corresponding two display screens (e.g., the display screens 110*a*, 110*b*) may be different. In general, in order to enable the light beam L1 to be refracted at the first refracting surface 1221*a* and totally reflected at the first total reflecting surface 1221*b*, and enable the light beam L2 to be refracted at the second refracting surface 1222*a* and totally reflected at the second total reflecting surface 1222*b*, the first prism pillars 1221 and the second prism pillars 1222 further have the following designs, for example: each of the first prism pillars 1221 has two inner angles $\theta a1$, $\theta a2$ adjacent to the base 121, the inner angle $\theta a1$ is located between the inner angle $\theta a2$ and the second region R2, and $\theta a1 < \theta a2$. Each of the second prism pillars 1222 has two inner angles $\theta b1$, $\theta b2$ adjacent to the base 121, the inner angle $\theta b1$ is located between the inner angle $\theta b2$ and the first region R1, and $\theta b1 < \theta b2$. In one embodiment, the inner angles $\theta a1$, $\theta a2$, $\theta b1$, $\theta b2$ also satisfy the following relationship: $50° \leq \theta a1 < 70°$, $60° \theta a2 \leq 90°$, $50° \leq \theta b1 < 70°$, $60° \leq \theta b2 \leq 90°$. In one embodiment, the inner angle $\theta a1 = \theta b1 = 67°$, and $\theta a2 = \theta b2 = 73°$.

In the prism structure optical element 120 of the embodiment, by the angular design of the inner angles $\theta a1$, $\theta a2$, $\theta b1$, $\theta b2$ of the first prism pillars 1221 and the second prism pillars 1222, most of the light beams L1, L2 may be emitted forward after the light beams L1, L2 emitted forward from the display area 111 of the display screens 110*a*, 110*b* are incident on the prism structure optical element 120 and are refracted and totally reflected. Through the refraction and total reflection of the prism structure optical element 120, an area corresponding to the side 113 adjacent to each other in the frames 112 of the two adjacent display screens 110*a*, 110*b* also has the light beams L1, L2 transmitted toward a viewer. Therefore, the viewer would not view the side edges 113 adjacent to each other in the frames 112 of the two adjacent display screens 110*a*, 110*b*. When two adjacent display screens 110*a*, 110*b* jointly display one image, the viewer can view a good splicing image without affecting the display quality due to the frames 112. Similarly, since the prism structure optical element 120 is disposed between the two adjacent display screens 110a, 110c of FIG. 1, the display quality would not affected by the frames 112.

Figure 4:
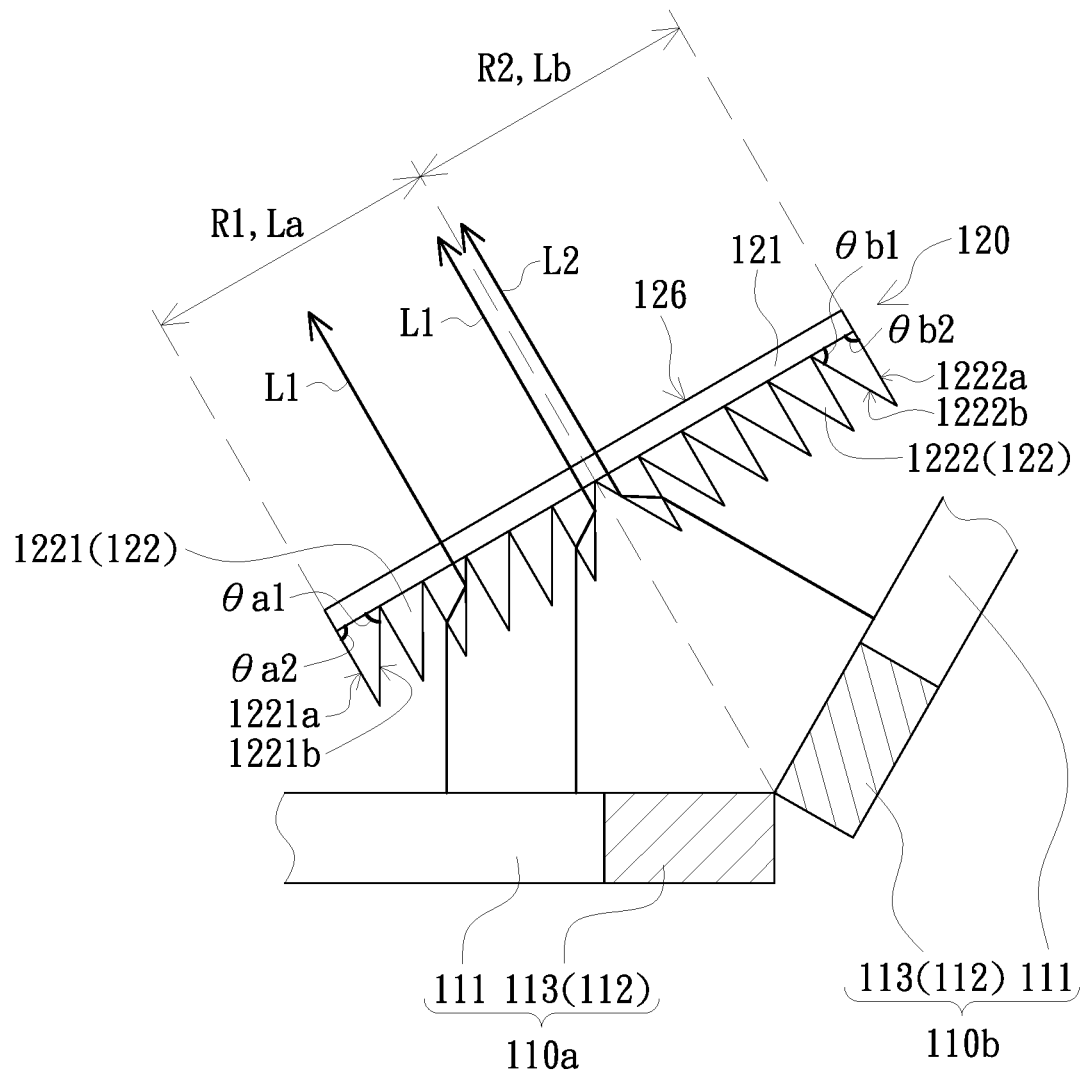
FIG. 4 is a schematic diagram of a prism structure optical element of a display apparatus with multi screens refracting light of another embodiment of the invention.

In another embodiment, as shown in FIG. 4, the inner angle θa1=θb1=60°, θa2=θb2=90°, so that the light beams L1, L2 may almost be emitted forward after the light beams L1, L2 emitted forward from the display area 111 of the display screens 110a, 110b are incident on the prism structure optical element 120 and are refracted and totally reflected. Through the refraction and total reflection of the prism structure optical element 120, an area corresponding to the side edges 113 adjacent to each other in the frames 112 of the two adjacent display screens 110a, 110b also has the light beams L1, L2 transmitted toward a viewer. Therefore, the viewer would not view the side edges 113 adjacent to each other in the frames 112 of the two adjacent display screens 110a, 110b. When two adjacent display screens 110a, 110b jointly display one image, the viewer can view a good splicing image without affecting the display quality due to the frames 112.

Figure 5:
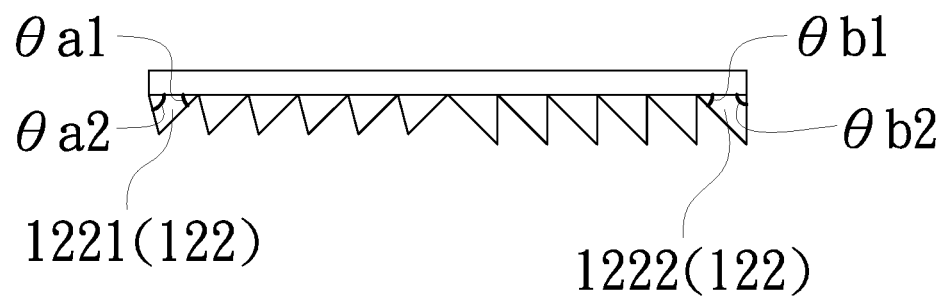
FIG. 5 is a schematic diagram of a prism structure optical element of a display apparatus with multi screens of another embodiment of the invention.

Although the embodiment of FIG. 2 to FIG. 4 is an example in which the angles of the inner angles θa1, θb1 are the same and the angles of the inner angles θa2, θb2 are the same, in other embodiments, the angles of the inner angles θa1, θb1 may be different, and the angles of the inner angles θa2, θb2 may be different depending on different design requirements. For example, as shown in FIG. 5, the inner angles θa1, θa2, θb1, and θb2 satisfy the following relationship: $50° \leq \theta a1 < 70°$, $60° \leq \theta a2 \leq 90°$, $50° \leq \theta b1 < 70°$, $60° \leq \theta b2 \leq 90°$, wherein the inner angle θa1 is equal to, for example, 67°, θa2 is equal to, for example, 73°, θb1 is equal to, for example, 60°, and the inner angle θb2 is equal to, for example, 90°. In another embodiment, the inner angle θa1 is equal to, for example, 60°, θa2 is equal to, for example, 90°, θb1 is equal to, for example, 67°, and the internal angle θb2 is, for example, equal to 73°.

Figure 6:
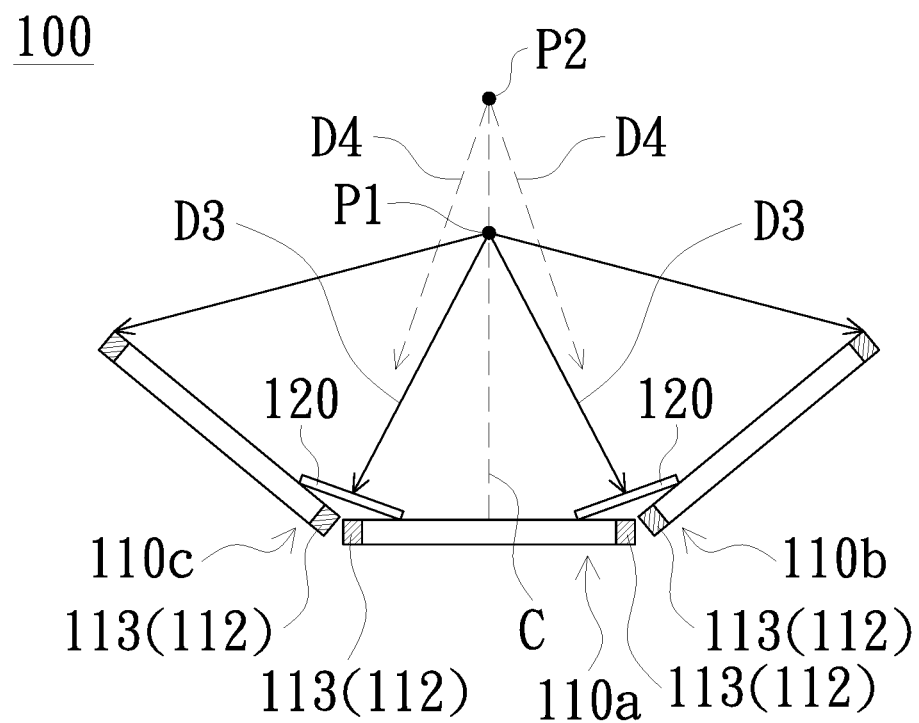
FIG. 6 is a schematic diagram of a viewer viewing a display apparatus with multi screens at different viewing positions.
Figure 7A:
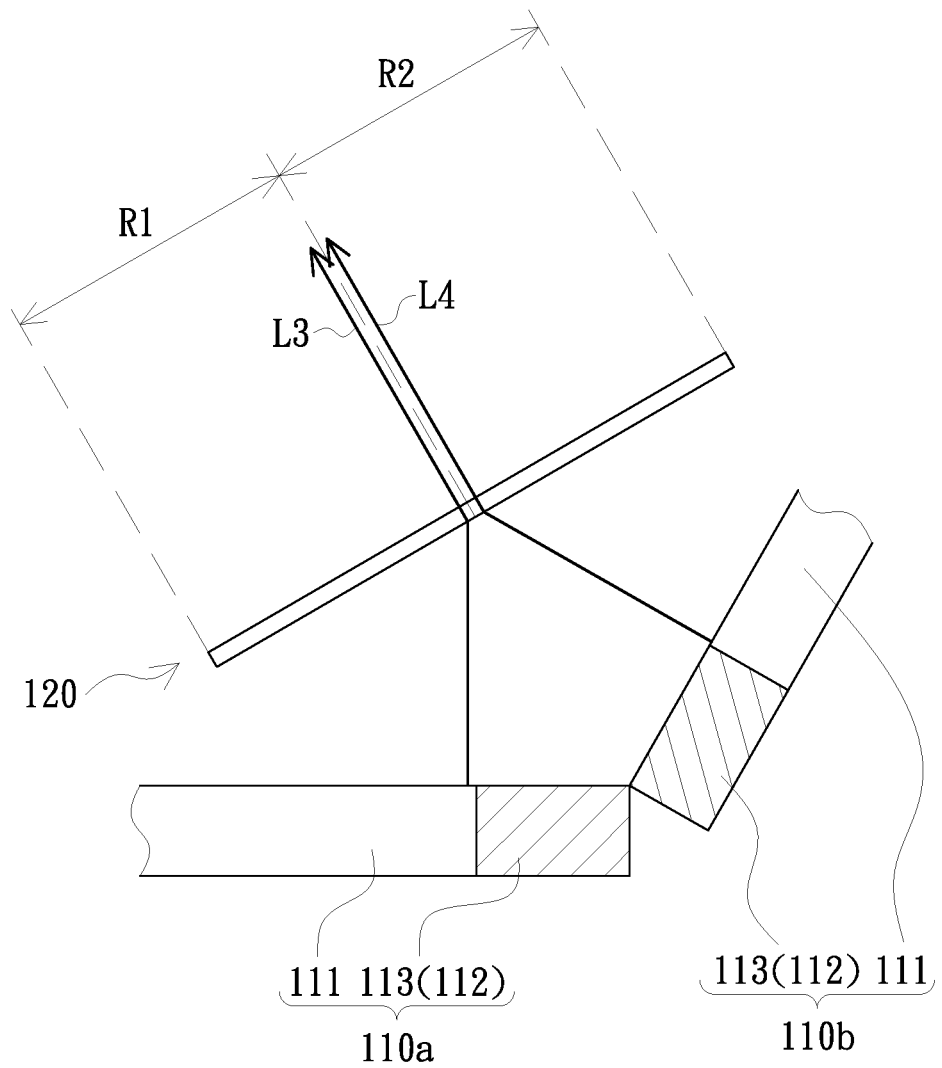
FIG. 7A is a schematic diagram of a partial optical path when a viewer is at a viewing position P1 of FIG. 6.
Figure 7B:
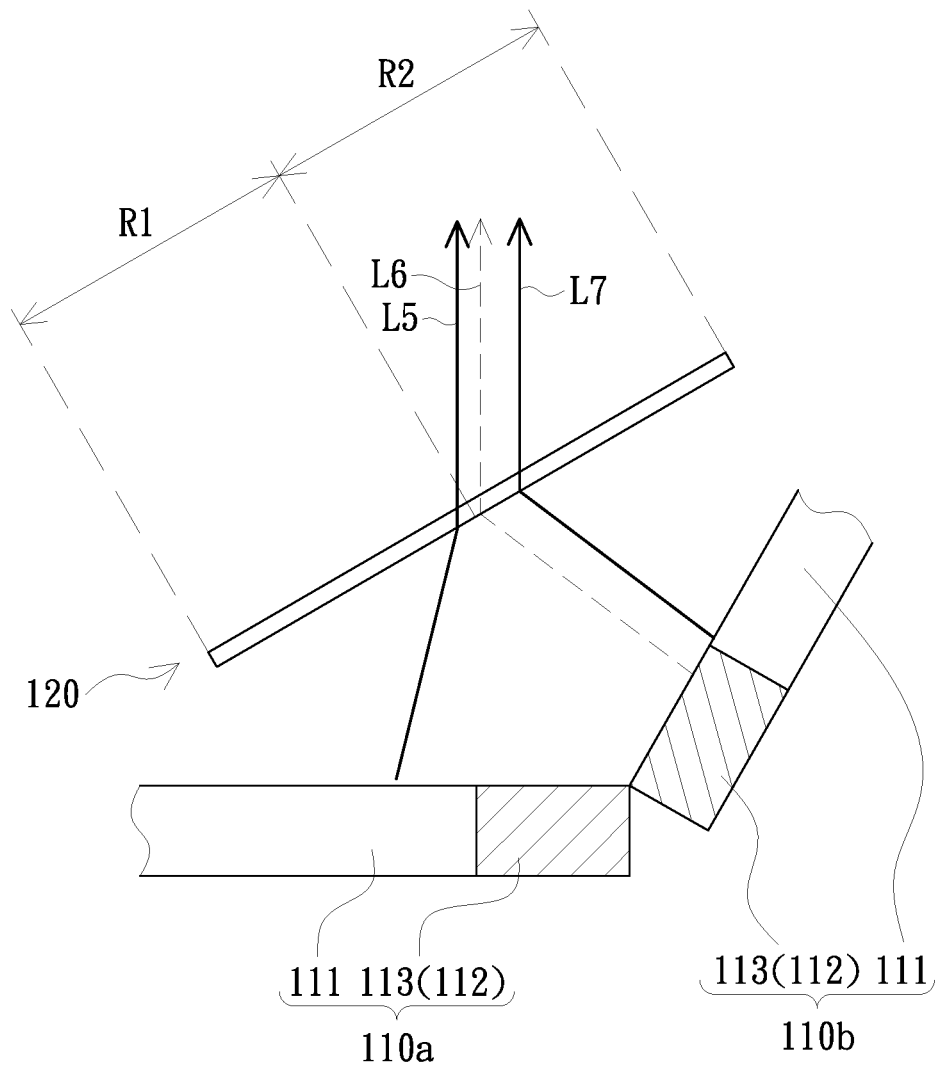
FIG. 7B is a schematic diagram of a partial optical path when a viewer is at a viewing position P2 of FIG. 6.

FIG. 6 is a schematic diagram of a viewer viewing a display apparatus with multi screens at different viewing positions. FIG. 7A is a schematic diagram of a partial optical path when a viewer is at a viewing position P1 of FIG. 6. FIG. 7B is a schematic diagram of a partial optical path when a viewer is at a viewing position P2 of FIG. 6. Referring to FIG. 6 and FIG. 7A first, the display apparatus with multi screens 100 of the embodiment uses two prism structure optical elements 120 of FIG. 2, and has a preferred viewing position P1 on a center line C of the display screen 110a. When the viewer is viewing the position P1, light beams L3, L4 of FIG. 7A are substantially parallel to a viewing direction D3 of the viewer in FIG. 6. In other words, the viewer will receive the light beams L3, L4, wherein the light beam L3 is from the display area 111 of the display screen 110a and is emitted to the viewer via a place where the first region R1 of the prism structure optical element 120 adjacent to the second region R2, and the light beam L4 is from the display area 111 of the display screen 110b and is emitted to the viewer via a place where the second region R2 of the prism structure optical element 120 adjacent to the first region R1. Therefore, even if the viewer views a boundary between the first region R1 and the second region R2, the two side edges 113 adjacent to each other in the frames 112 of the display screens 110a, 110b are not seen.

Referring to FIG. 6 and FIG. 7B, when the viewer is at a viewing position P2 that is farther from the display screen 110a, the viewing direction changes, and light beams L5, L6, L7 of FIG. 7B are substantially parallel to a viewing direction D4 of the viewer in FIG. 6. In other words, the viewer will receive the light beams L5, L6, L7, wherein the light beam L5 is from the display area 111 of the display screen 110a and is emitted to the viewer via a place where the first region R1 of the prism structure optical element 120 adjacent to the second region R2, and the light beam L7 is from the display area 111 of the display screen 110b and is emitted to the viewer via the second region R2 of the prism structure optical element 120. However, the light beam L7 is from an edge of the display area 111 of the display screen 110b, which is not emitted to the viewer via the second region R2 of the prism structure optical element 120 adjacent to the first region R1. The light beam L6 emitted to the viewer via the second region R2 of the prism structure optical element 120 adjacent to the first region R1 is from the side edge 113 of the frame 112 of the display screen 110b adjacent to the display screen 110a. Therefore, the viewer may view the side edge 113 of the frame 112 of the display screen 110b adjacent to the display screen 110a. Similarly, the viewer may also view the side edge 113 of the frame 112 of the display screen 110c adjacent to the display screen 110a.

Figure 8:
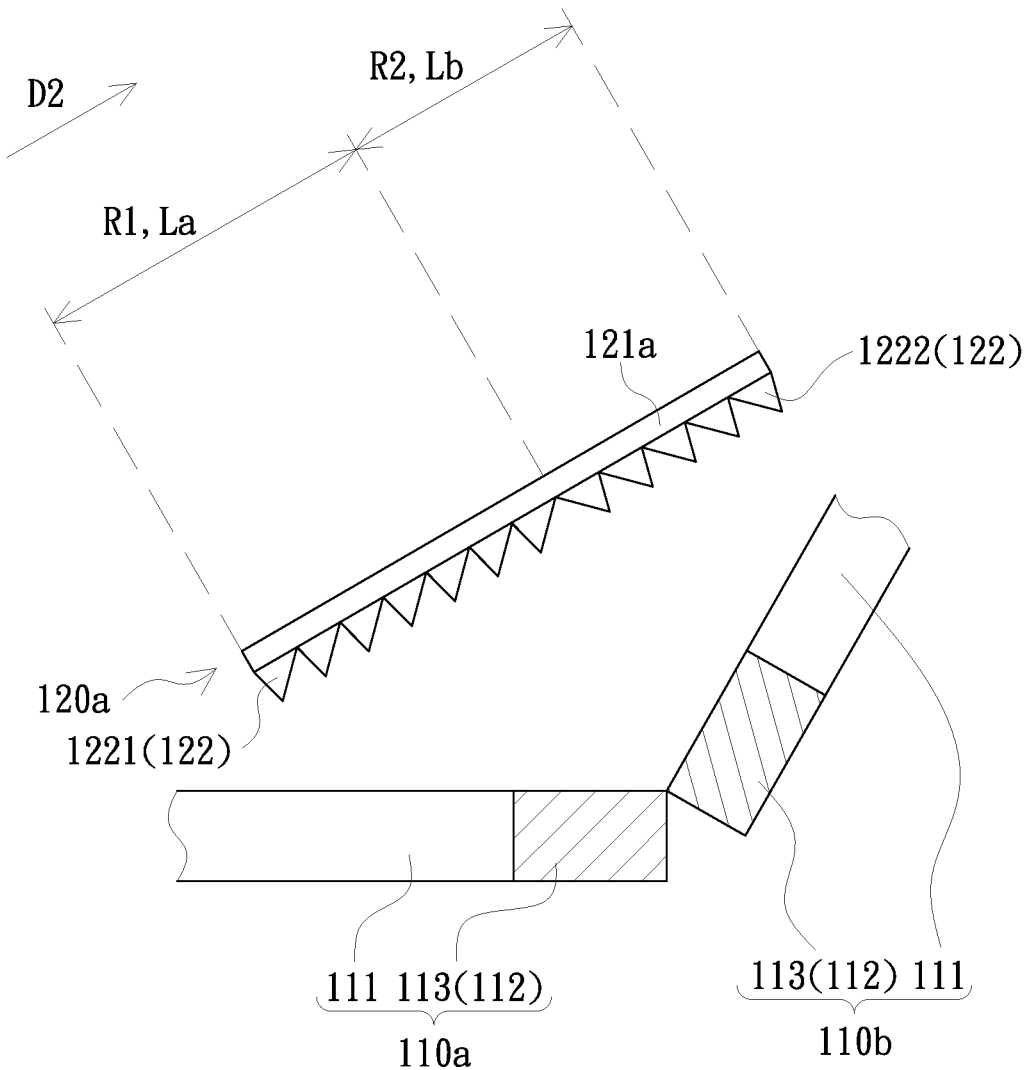
FIG. 8 is a schematic diagram of a prism structure optical element of a display apparatus with multi screens refracting light of another embodiment of the invention.

In order to solve the above problem, as shown in FIG. 8, the difference between FIG. 8 and FIG. 7B is that the length La of the first region R1 of the base 121a of the prism structure optical element 120a in the predetermined direction D2 is designed to be longer than the length Lb of the second region R2 in the predetermined direction D2. In addition to correspond to a portion of one of the two display screens 110a, 110b, the first region R1 further corresponds to a portion of the other of the two display screens 110a, 110b. Taking FIG. 8 as an example, the prism structure optical element 120a covers the display screens 110a, 110b, and its first region R1 corresponds to a portion of the display screen 110a, and further corresponds to a portion of the display screen 110b. Similarly, when the prism structure optical element 120a covers the display screens 110a, 110c of FIG. 6, its first region R1 corresponds to a portion of the display screen 110a, and further corresponds to a portion of the display screen 110c. In one embodiment, the length La and the length Lb are, for example, satisfy the following relationship: $1 < La/Lb \leq 1.2$.

Figure 9A:
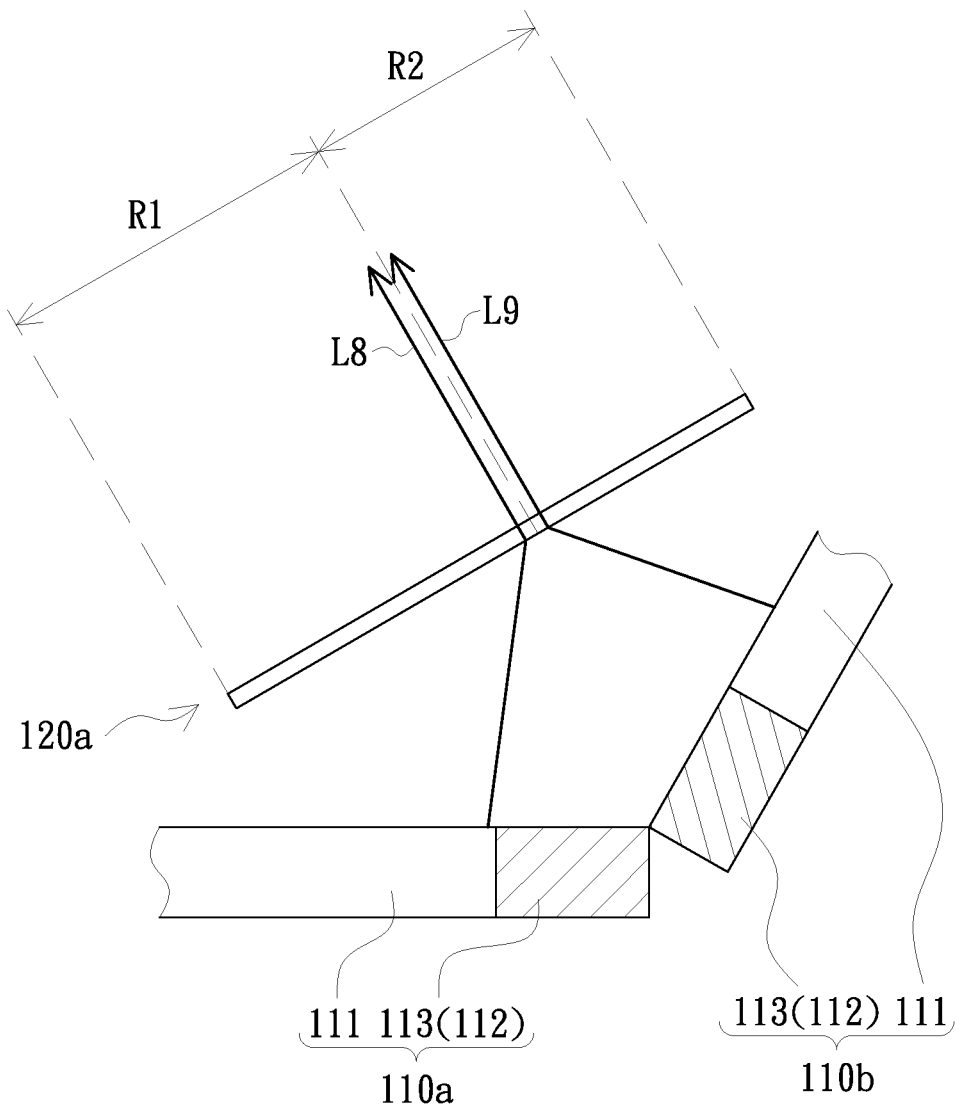
FIG. 9A is a schematic diagram of a partial optical path when a viewer views a display device of FIG. 8 at a preferred viewing position.
Figure 9B:
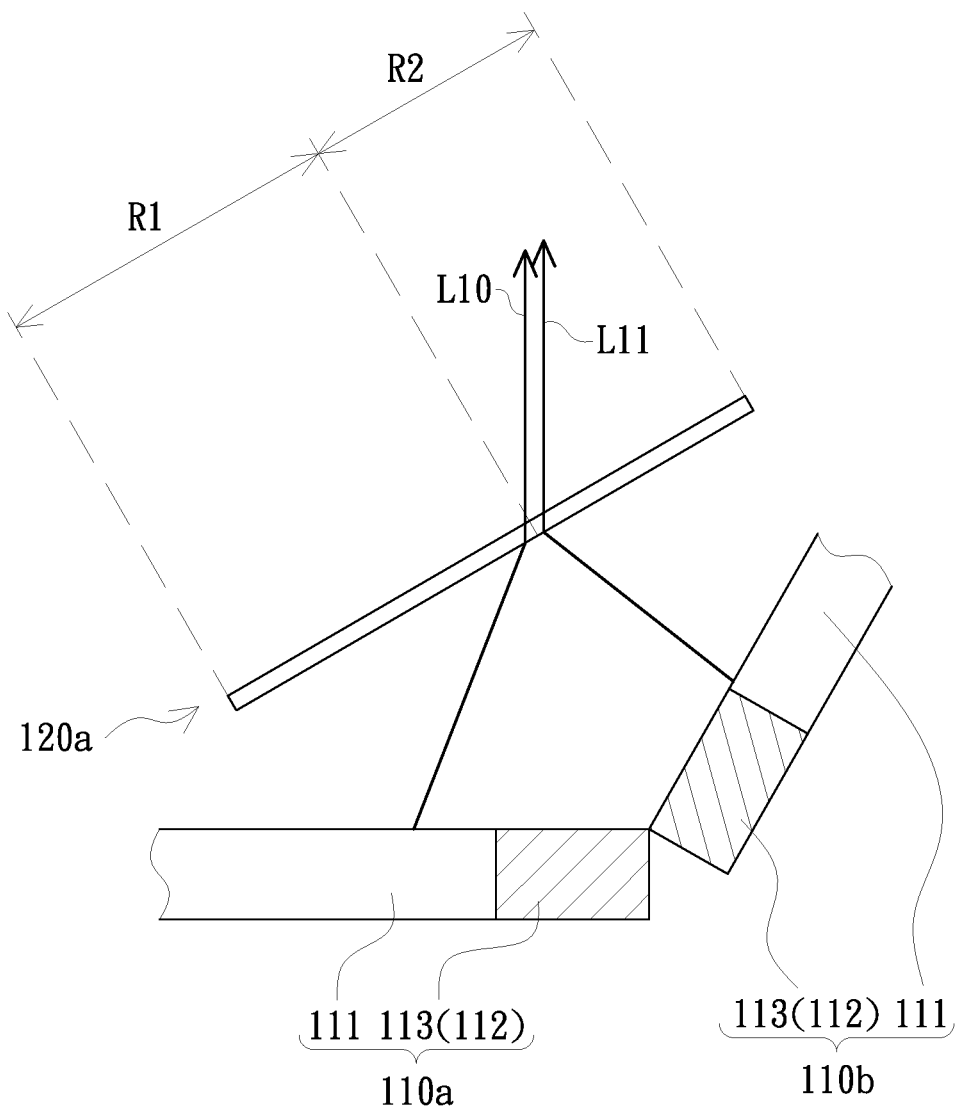
FIG. 9B is a schematic diagram of a partial optical path when a viewer views a display device of FIG. 8 at a farther viewing position.

FIG. 9A is a schematic diagram of a partial optical path when a viewer views a display device of FIG. 8 at a preferred viewing position. FIG. 9B is a schematic diagram of a partial optical path when a viewer views a display device of FIG. 8 at a farther viewing position. Referring to FIG. 9A first, when the viewer is in a preferred viewing position, for example the viewing position P1 in FIG. 6, light beams L8, L9 of FIG. 9A are substantially parallel to the viewing direction of the viewer. In other words, the viewer will receive the light beams L8, L9, wherein the light beam L8 is from the display area 111 of the display screen 110a and is emitted to the viewer via a place where the first region R1 of the prism structure optical element 120 adjacent to the second region R2, and the light beam L9 is from the display area 111 of the display screen 110b and is emitted to the viewer via a place where the second region R2 of the prism structure optical element 120 adjacent to the first region R1. Therefore, even if the viewer views a boundary between the first region R1 and the second region R2, the two side edges 113 adjacent to each other in the frames 112 of the two adjacent display screens 110a, 110b are not seen.

Referring to FIG. 9B, when the viewer is farther away from the display screen 110a than the preferred viewing position, for example, at the viewing position P2 in FIG. 6, the viewing direction changes, and light beams L10, L11 of FIG. 9B are substantially parallel to a viewing direction of the viewer. In other words, the viewer will receive the light beams L10, L11, wherein the light beam L10 is from the display area 111 of the display screen 110a and is emitted to the viewer via a place where the first region R1 of the prism structure optical element 120 adjacent to the second region R2, and the light beam L11 is from the display area 111 of the display screen 110b and is emitted to the viewer via the second region R2 of the prism structure optical element 120. Therefore, even if the viewer views a boundary between the first region R1 and the second region R2, the two side edges 113 adjacent to each other in the frames 112 of the two adjacent display screens 110a, 110b are not seen.

In summary, the display apparatus with multi screens of the embodiment of the invention has a prism structure optical element covering two side edges adjacent to each other in the frames of the two adjacent display screens and portions of the display areas of the display screens. The prism structure optical element can direct a light emitted from a portion of the display area that is covered by the prism structure optical element to a viewer's eye, so that when the viewer views an image composed of multi display screens, it is not easy to perceive the frame and the prism structure optical element between the two adjacent display screens, thereby improving the display quality. In addition, the prism pillars of the prism structure optical element are disposed on a side facing the two adjacent display screens, which can prevent the prism pillars from being damaged or scratched by touching the prism pillars when the viewer adjusts or disposes the prism structure optical element, thereby affecting the display quality.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first prism pillar, the second prism pillar, the first refracting surface, the second refracting surface, the first total reflecting surface, the second total reflecting surface, the first region and the second region are only used for distinguishing various elements and do not limit the number of the elements.

What is claimed is:

1. A display apparatus with multi screens, comprising:
a plurality of display screens, arranged adjacent to each other, wherein at least one of the two adjacent display screens of the display screens have an included angle greater than 90 degrees and less than 180 degrees, and each of the display screens has a display area and a frame surrounding the display area;
at least one prism structure optical element, disposed between the two adjacent display screens having an included angle respectively, and covering two side edges adjacent to each other in the frames and portions of the display areas of the two adjacent display screens respectively, wherein each of the at least one prism structure optical element comprises a base and a plurality of prism pillars arranged on the base in a predetermined direction and facing the two adjacent display screens, and each of the plurality of prism pillars extend in a direction substantially parallel to the two side edges adjacent to each other, the base includes a first region and a second region adjacent to the first region, respectively corresponding to portions of the two adjacent display screens, the first region has a length La in the predetermined direction, the second region has a length Lb in the predetermined direction, and La≥Lb, the prism pillars comprise a plurality of first prism pillars arranged in the first region and a plurality of second prism pillars arranged in the second region, each of the first prism pillars has a first total reflecting surface and a first refracting surface, and the first total reflecting surface is located between the first refracting surface and the second region, each of the second prism pillars has a second total reflecting surface and a second refracting surface, and the second total reflecting surface is located between the second refracting surface and the first region.

2. The display apparatus with multi screens according to claim 1, wherein La>Lb, and in addition to correspond to a portion of one of the two adjacent display screens, the first region further corresponds to a portion of the other of the two adjacent display screens.

3. The display apparatus with multi screens according to claim 1, wherein 1≤La/Lb≤1.2.

4. The display apparatus with multi screens according to claim 1, wherein each of the first prism pillars has two inner angles θa1, θa2 adjacent to the base, the inner angle θa1 is an included angle between the first total reflection surface and the base, the inner angle θa2 is an included angle between the first refractive surface and the base, and θa1<θa2, each of the second prism pillars has two inner angles θb1, θb2 adjacent to the base, the inner angle θb1 is an included angle between the second total reflection surface and the base, the inner angle θb2 is an included angle between the second refractive surface and the base, and θb1<θb2.

5. The display apparatus with multi screens according to claim 4, wherein the plurality of prism pillars is a triangular prism pillar, and $50°≤θa1<70°$, $60°≤θa2≤90°$, $50°≤θb1<70°$, $60°≤θb2≤90°$.

6. The display apparatus with multi screens according to claim 5, wherein $θa1=θb1=67°$, $θa2=θb2=73°$.

7. The display apparatus with multi screens according to claim 5, wherein $θa1=θb1=60°$, $θa2=θb2=90°$.

8. The display apparatus with multi screens according to claim 1, wherein the quantity of the display screens is three, and the quantity of the at least one prism structure optical element is two, the first regions of the prism structure optical elements correspond to the display screen located in the middle of the display screens.

* * * * *